US010231549B2

(12) United States Patent
Johnson et al.

(10) Patent No.: US 10,231,549 B2
(45) Date of Patent: Mar. 19, 2019

(54) MULTI-FUNCTION SEAT CUSHION

(71) Applicant: B/E AEROSPACE, INC., Wellington, FL (US)

(72) Inventors: Glenn A. Johnson, Rural Hall, NC (US); Lazaro Martinez, Missouri City, TX (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 15/808,005

(22) Filed: Nov. 9, 2017

(65) Prior Publication Data
US 2018/0125244 A1 May 10, 2018

Related U.S. Application Data

(60) Provisional application No. 62/420,139, filed on Nov. 10, 2016.

(51) Int. Cl.
*A47C 7/20* (2006.01)
*A47C 7/42* (2006.01)
*A47C 7/02* (2006.01)
*A47C 7/54* (2006.01)
*B60N 2/75* (2018.01)
*B64D 11/06* (2006.01)

(52) U.S. Cl.
CPC .............. *A47C 7/425* (2013.01); *A47C 7/021* (2013.01); *A47C 7/20* (2013.01); *A47C 7/546* (2013.01); *B60N 2/787* (2018.02); *B64D 11/0647* (2014.12)

(58) Field of Classification Search
CPC ........... A47C 7/425; A47C 7/021; A47C 7/20; A47C 7/546; A47C 7/40; A47C 7/18; A47C 7/185; B60N 2/787; B64D 11/06
USPC ...................................................... 297/230.13
See application file for complete search history.

(56) References Cited

U.S. PATENT DOCUMENTS

| | | | | | |
|---|---|---|---|---|---|
| 3,009,232 | A | * | 11/1961 | Martin | D03D 3/00 139/384 R |
| 3,318,756 | A | * | 5/1967 | Pollock | A47C 7/18 138/DIG. 9 |
| 4,761,035 | A | * | 8/1988 | Urai | A47C 7/18 297/224 |
| 5,235,826 | A | * | 8/1993 | Brooks | D04B 1/22 297/452.58 |
| 5,501,891 | A | * | 3/1996 | Saika | D03D 11/02 139/384 R |
| 6,010,652 | A | * | 1/2000 | Yoshida | D03D 11/02 139/384 R |
| 6,085,369 | A | * | 7/2000 | Feher | A47C 27/22 5/421 |
| 6,955,192 | B2 | * | 10/2005 | Matsui | D03D 11/00 139/383 A |

(Continued)

*Primary Examiner* — Mark R Wendell
(74) *Attorney, Agent, or Firm* — Clements Bernard Walker PLLC

(57) ABSTRACT

A multi-function seat cushion including an inner layer adapted to resist compression in response to force applied in a longitudinal direction of the inner layer, and compress in response to force applied in a transverse direction of the inner layer, such that the multi-function seat cushion can be used as an armrest or armrest extension when in a first orientation, and can be used as a lumbar support when oriented in a second orientation different from the first orientation.

15 Claims, 3 Drawing Sheets

(56) References Cited

U.S. PATENT DOCUMENTS

| | | | | |
|---|---|---|---|---|
| 7,849,544 B2* | 12/2010 | Flocard | .............. | A61G 7/05769 |
| | | | | 5/710 |
| 8,419,135 B2* | 4/2013 | Moeseneder | ........ | B60N 2/5816 |
| | | | | 297/452.13 |
| 2003/0109908 A1* | 6/2003 | Lachenbruch | ....... | A47C 21/046 |
| | | | | 607/96 |
| 2014/0007761 A1* | 1/2014 | Haidar | .................... | F41H 7/042 |
| | | | | 89/36.02 |
| 2016/0332733 A1* | 11/2016 | Marappan | .......... | B64D 11/0647 |

\* cited by examiner

MULTI-FUNCTION SEAT CUSHION

RELATED APPLICATION AND INCORPORATION BY REFERENCE

This application claims priority from U.S. Application No. 62/420,139 filed Nov. 10, 2016, the entirety of which is incorporated by reference herein.

BACKGROUND

Passenger seats aboard airliners, buses, trains and other conveyances can be equipped with one or more armrests. Armrests positioned alongside a seat serve to define the lateral bounds of the seat, separate laterally adjacent seats, and enhance seating comfort. In the majority of commercial conveyances, seating density is maximized to increase revenue. As such, carriers often limit seat bottom and/or armrest width to increase the total number of laterally adjacent seats.

Decreased seat bottom width and/or armrest width lessens seating comfort. Therefore, it would be desirable to provide a separate cushion that can function as an armrest or armrest extension as needed, as well as serve another function when not being used as an armrest. Providing such a multi-function cushion would allow a seat manufacturer to lessen fixed armrest width, potentially eliminate fixed armrests altogether, increase seat bottom width, and save weight and costs, among other advantages.

SUMMARY

In one aspect, embodiments of the inventive concepts disclosed herein are directed to a multi-function seat cushion including an inner layer adapted to resist compression in response to force applied in a longitudinal direction of the inner layer and compress in response to force applied in a transverse direction of the inner layer, an outer cover layer, and an intermediate foam layer disposed between the inner layer and the outer cover layer.

In a further aspect, the inner layer can include a woven tubular fabric comprising a plurality of elongate parallel tubes.

In a further aspect, each of the plurality of elongate parallel tubes can have an elliptical cross-section.

In a further aspect, each of the plurality of elongate parallel tubes can be open ended.

In a further aspect, the woven tubular fabric can be folded and bonded or stitched along a longitudinal length of peaks of the folded woven tubular fabric such that the inner layer is provided in a repeating zigzag pattern.

In a further aspect, the multi-function seat cushion can function as an armrest when the longitudinal direction of the inner layer is oriented vertically, and can function as a lumbar support when the longitudinal direction of the inner layer is oriented horizontally.

In a further aspect, the multi-function seat cushion can be wedge-shaped or elliptical-shaped.

In another aspect, embodiments of the inventive concepts disclosed herein are directed to a multi-function seat cushion including an inner layer comprising a tubular fabric adapted to resist compression in response to force applied in a longitudinal direction of the tubular fabric and compress in response to force applied in a transverse direction of the tubular fabric, and an outer layer enclosing the inner layer.

In a further aspect, an intermediate foam layer can be disposed between the inner layer and the outer layer, and the intermediate layer can include at least one of open cell foam and closed cell foam.

In yet another aspect, embodiments of the inventive concepts disclosed herein are directed to a method of extending armrest width of a seat equipped with an armrest, the method including providing a multi-function seat cushion including an inner layer and an outer layer enclosing the inner layer, the inner layer adapted to resist compression in response to force applied in a longitudinal direction of the inner layer and compress in response to force applied in a transverse direction of the inner layer, and positioning the multi-function seat cushion against an armrest such that the longitudinal direction of the inner layer is oriented vertically.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

The inventive concepts are described hereinafter with reference to the accompanying drawings in which exemplary embodiments are shown. However, the inventive concepts may be embodied in many different forms and should not be construed as limited to the representative embodiments set forth herein.

The inventive concepts disclosed herein are generally directed to a multi-function seat cushion for use by a passenger seated aboard an airliner or other conveyance. The multi-function cushion is configured to compress in a first direction while resisting compression in a second direction different from the first direction. For example, the multi-function cushion may compress in a direction into a face of the cushion such that the cushion can be oriented for use as a lumbar support, and the multi-function cushion may resist compression in a direction into an end of the cushion such that the cushion can be oriented for use as an armrest or armrest extension. Thus, the function of the seat cushion changes by changing the orientation of the seat cushion. The seat cushion can further include foam such that the seat cushion can also serve as an emergency flotation device.

Figure 1A:
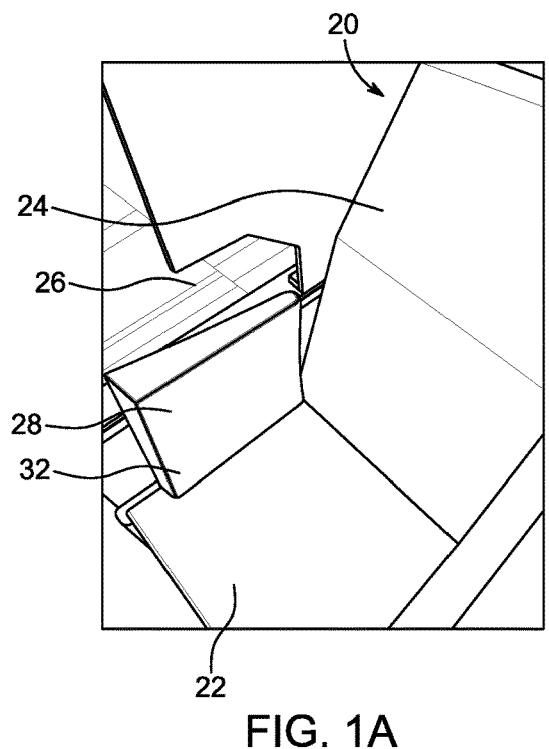
FIG. 1A is perspective view of a passenger seat showing a multi-function cushion oriented for use as an armrest and/or armrest extension.
Figure 1B:
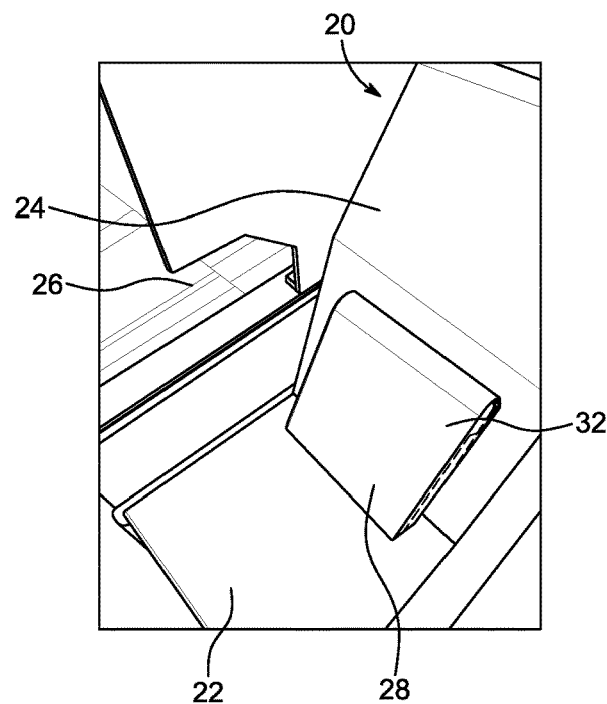
FIG. 1B shows the passenger seat of FIG. 1A with the multi-function cushion oriented for use as a lumbar support.

In an exemplary application, FIGS. 1A and 1B depict an exemplary passenger seat 20 of a type commonly found aboard an airliner, bus, train, or other conveyance. The passenger seat 20 generally includes a seat bottom 22, a seatback 24, and optionally one or more dedicated armrests 26. The passenger seat 20 can include left-hand and right-hand armrests, and a single armrest can be shared between and serve laterally-adjacent seats. Armrests can be static or can deploy from a stowed position to facilitate seat ingress/egress, for example, from alongside the seatback 24.

A multi-function seat cushion 28, also referred to herein as the "seat cushion," for use by the seated passenger is separate and removable from the passenger seat 20. As shown in FIG. 1A, the seat cushion 28 is oriented for use as an armrest or armrest extension. As shown in FIG. 1B, the seat cushion 28 is oriented for use as a lumbar support. Thus, comparing FIGS. 1A and 1B, the seat cushion 28 can provide different functionality depending on the orientation of the seat cushion. Additionally, the seat cushion 28 can be configured to serve as an emergency flotation device.

Referring to FIG. 1A, the seat cushion 28 can be wedge-shaped and can function in a first orientation as an armrest, or to extend the width of a dedicated seat armrest. As shown, the seat cushion 28 has a "height" such that the seat cushion extends from a top surface of the seat bottom 22 to a top surface of the armrest 26, such that the top surface of the armrest and the top surface of the seat cushion are coplanar to effectively widen the width of the armrest. A wider armrest is desirable for comfort, particularly in the case of an armrest shared between laterally-adjacent seats. The dimensions of the armrest can be customized based on the passenger seat dimensions, and particularly the distance between the top surface of the seat bottom and the top surface of the armrest when fully deployed. In the armrest orientation, the seat cushion 28 resists compression in response to vertical forces applied from above (i.e., $F_{(grav)}$).

Referring to FIG. 1B, the seat cushion 28 can be rotated 90 degrees from the armrest position of FIG. 1A, and positioned flush against the seatback 22 to function in a second orientation as a lumbar support. The seat cushion 28 can additionally be repositioned and reoriented to function as a headrest, pillow, foot rest, etc., depending on passenger need. In the lumbar support orientation shown in FIG. 1B, achieved by rotating the cushion ninety degrees, the seat cushion 28 is able to compress in the transverse direction (i.e., $F_{(applied)}$ in the direction into the seatback 22).

Resistance against compression in one orientation makes the seat cushion 28 suitable for use as a stable armrest. The seat cushion 28 can be used alone, against the fixed armrest 26 to expand the supporting surface area of the armrest, or against a wall. When the seat cushion 28 is not being used, or is used as a lumbar support, the seat bottom width is expanded. Thus, the seat cushion 28 can be used to enhance seat comfort or when full seat bottom width is not needed, and can be removed when additional armrest support is not needed or when full seat bottom width is needed.

The seat cushion 28 as shown is wedge-shaped, but can have any cross-sectional shape or dimension dependent upon or independent of the accompanying seat, shape of the fixed armrest, etc. Envisioned seat cushion shapes include, but are not limited to, wedge, rectangular, teardrop, triangular, elliptical, circular, oval, trapezoidal, etc.

Figure 2A:
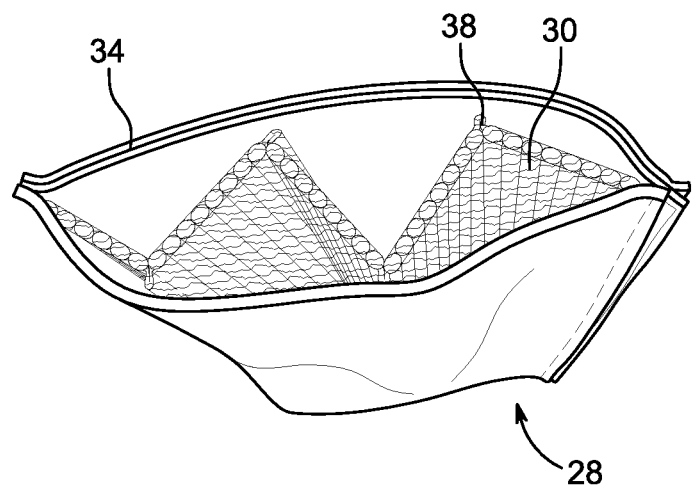
FIG. 2A is an end of the multi-function cushion with the outer cover layer removed.
Figure 2B:
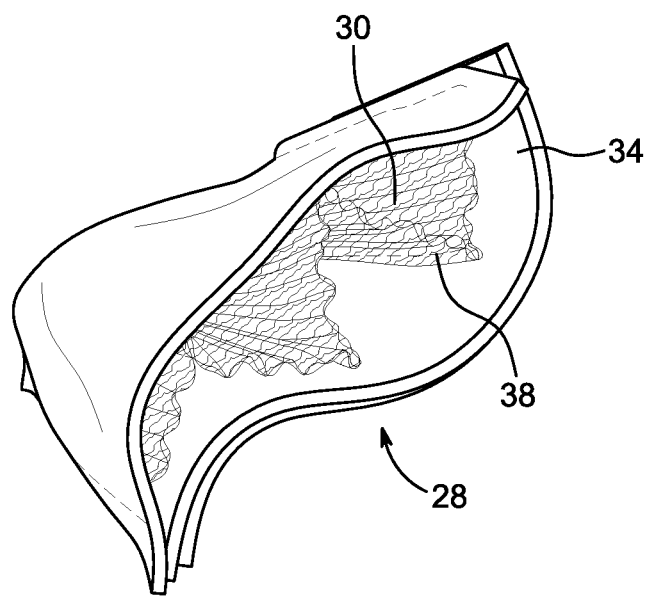
FIG. 2B is an end view of the multi-function cushion with the outer cover layer removed and compressed in a transverse direction.

FIGS. 2A and 2B generally illustrate the internal seat cushion construction. The seat cushion 28 generally includes an inner layer 30 including a woven tubular fabric, an outer layer 32 (see FIGS. 1A and 1B), and an optional intermediate foam layer 34. The inner layer 30 imparts the compressibility profile of the cushion 28. The outer layer 32 encloses the inner layer 30 and functions as the protective and aesthetic covering. The intermediate foam layer 34 provides additional cushioning and comfort. The intermediate foam layer 34 can include at least one of open cell foam for comfort, and closed cell foam for flotation, depending on the desired compression profile, water-resistance (e.g., flotation device), etc. The intermediate foam layer 34 can fully encapsulate, substantially encapsulate, or be strategically placed around the inner layer 30. FIG. 2A shows an elliptical shaped cushion in an uncompressed state, while FIG. 2B shows compression in the transverse direction as would occur when used as a lumbar support or pillow.

Figure 3:
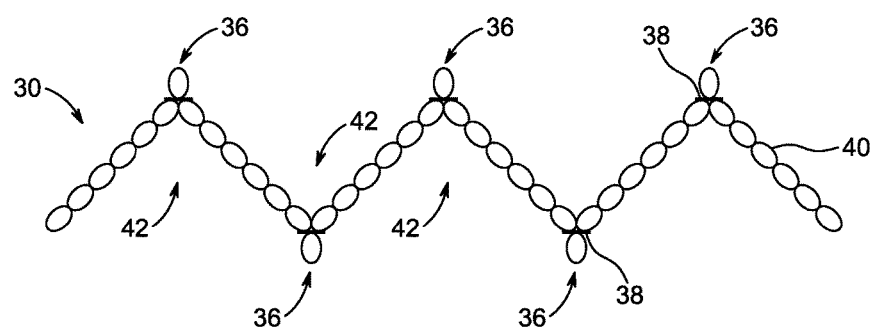
FIG. 3 is an end view of the innermost layer of the multi-function cushion.

FIG. 3 shows an exemplary internal arrangement of the inner layer 30. The inner layer is arranged into a repeating pattern, for example a zigzag pattern, which imparts thickness to the seat cushion 28. The pattern includes peaks 36 created by folding the woven tubular fabric 40 and stitching along the longitudinal length near each of the peaks, with the stitching shown in FIGS. 2A, 2B and 3 at reference numeral 38. The longitudinal stitches 38 are necessary to overcome the memory/tendency of the woven tubular fabric 40 to return to a planar state. The pattern further gives thickness to the cushion 28. The troughs 42 formed between the peaks 36 can be left empty or can be occupied with foam or like material. Although stitching is shown, other suitable methods for achieving the desired zigzag or other pattern include heat bonding, adhesives, etc.

Figure 4A:
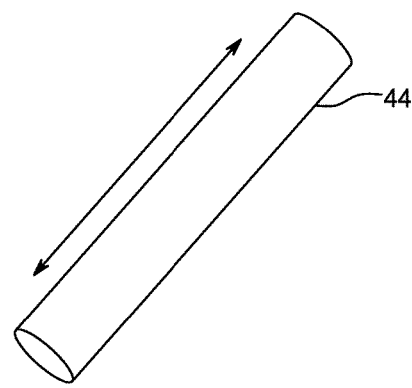
FIG. 4A is a perspective view of a single tube of the innermost layer of the multi-function cushion.
Figure 4B:
FIG. 4B is an end view of the single tube of FIG. 4A.

FIGS. 4A and 4B show the respective longitudinal and transverse directions of a single tube 44 of the woven tubular fabric. While each tube 44 resists compression and bending in the longitudinal direction shown in FIG. 4A, each tube 44 is able to compress or bend in the transverse direction shown in FIG. 4B. The tubes are aligned side-by-side to form a sheet of the woven tubular fabric. Suitable examples of tubular fabrics include, but are not limited to, performance fabrics available from Lumite™ of Alto, Ga., USA, enhanced for shock absorption, cushioning, light weight and breathability. Suitable cross sections of each individual tube include, but are not limited to, elliptical and circular.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A multi-function seat cushion, comprising:
   an inner layer adapted to resist compression in response to force applied in a longitudinal direction of the inner layer, and compress in response to force applied in a transverse direction of the inner layer, the inner layer comprising a woven tubular fabric including a plurality of elongate parallel tubes, wherein the woven tubular fabric is folded and bonded or stitched along a longitudinal length of peaks of the folded woven tubular fabric such that the inner layer is provided in a repeating zigzag pattern;
   an outer cover layer; and
   an intermediate foam layer disposed between the inner layer and the outer cover layer.

2. The multi-function seat cushion of claim 1, wherein each of the plurality of elongate parallel tubes has an elliptical cross-section.

3. The multi-function seat cushion of claim 1, wherein each of the plurality of elongate parallel tubes is open ended.

4. The multi-function seat cushion of claim 1, wherein the multi-function seat cushion functions as an armrest when the longitudinal direction of the inner layer is oriented vertically, and functions as a lumbar support when the longitudinal direction of the inner layer is oriented horizontally.

5. The multi-function seat cushion of claim 1, wherein the multi-function seat cushion is wedge-shaped or elliptical-shaped.

6. A multi-function seat cushion, comprising:
an inner layer comprising a tubular fabric adapted to resist compression in response to force applied in a longitudinal direction of the tubular fabric, and compress in response to force applied in a transverse direction of the tubular fabric, the tubular fabric including a plurality of elongate parallel tubes folded and bonded or stitched to form a zigzag pattern; and
an outer layer enclosing the inner layer.

7. The multi-function seat cushion of claim 6, further comprising an intermediate foam layer disposed between the inner layer and the outer layer.

8. The multi-function seat cushion of claim 7, wherein the intermediate foam layer comprises at least one of open cell foam and closed cell foam.

9. The multi-function seat cushion of claim 6, wherein the multi-function cushion is wedge-shaped or elliptical shaped.

10. The multi-function seat cushion of claim 6, wherein the multi-function seat cushion functions as an armrest when the longitudinal direction of the inner layer is oriented vertically, and functions as a lumbar support when the longitudinal direction of the inner layer is oriented horizontally.

11. A method of extending armrest width of a seat equipped with an armrest, comprising:
providing a multi-function seat cushion comprising an inner layer and an outer layer enclosing the inner layer, the inner layer adapted to resist compression in response to force applied in a longitudinal direction of the inner layer, and compress in response to force applied in a transverse direction of the inner layer, the inner layer comprising a woven tubular fabric including a plurality of elongate parallel tubes, wherein the woven tubular fabric is folded and bonded or stitched along a longitudinal length of peaks of the folded woven tubular fabric such that the inner layer is provided in a repeating zigzag pattern; and
positioning the multi-function seat cushion against an armrest such that the longitudinal direction of the inner layer is oriented vertically.

12. The method of claim 11, wherein each of the plurality of elongate parallel tubes has an elliptical cross-section and is open ended.

13. The method of claim 11, wherein the multi-function seat cushion is wedge-shaped or elliptical-shaped.

14. The method of claim 11, wherein the multi-function seat cushion further comprises a foam layer disposed between the inner layer and the outer layer.

15. The method of claim 14, wherein the foam layer comprises at least one of open cell foam and closed cell foam.

* * * * *